No. 822,833. PATENTED JUNE 5, 1906.
J. F. DURYEA.
FRICTION CLUTCH.
APPLICATION FILED DEC. 12, 1904.

2 SHEETS—SHEET 1.

Witnesses:
H. L. Sprague
E. L. Smith

Inventor:
James F. Duryea
by Chapin & Co
Attorneys.

No. 822,833. PATENTED JUNE 5, 1906.
J. F. DURYEA.
FRICTION CLUTCH.
APPLICATION FILED DEC. 12, 1904.
2 SHEETS—SHEET 2.
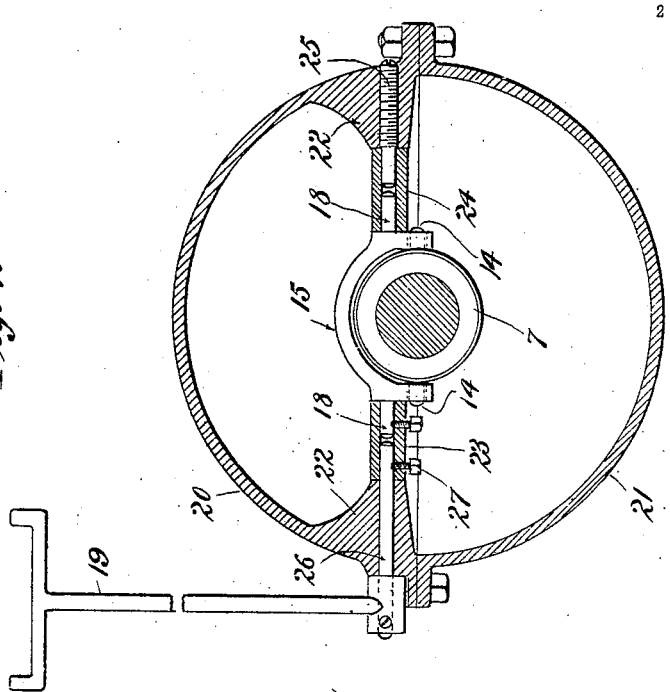
Witnesses.
H. L. Sprague
E. L. Smith
Inventor
James F. Duryea
by Chapin & Co
Attorneys.

UNITED STATES PATENT OFFICE.

JAMES FRANK DURYEA, OF SPRINGFIELD, MASSACHUSETTS.

FRICTION-CLUTCH.

No. 822,833.     Specification of Letters Patent.     Patented June 5, 1906.

Application filed December 12, 1904. Serial No. 236,502.

*To all whom it may concern:*

Be it known that I, JAMES FRANK DURYEA, a citizen of the United States of America, residing at Springfield, in the county of Hampden and State of Massachusetts, have invented new and useful Improvements in Friction-Clutches, of which the following is a specification.

This invention relates to friction-clutches, and has special reference to clutches of that type which comprise a series of concentrically-disposed rings on the driving and the driven members of the clutch, the peripheries of which overlap and which are pressed together to provide the requisite frictional contact, the object of the invention being to provide an improved clutch embodying this principle of construction, whereby the clutch may occupy as small a space as is consistent with the work it has to perform.

A further object of the invention is to construct the clutch in such manner that it may be readily taken apart for the purpose of adding to or removing the friction-rings or for the inspection of the same, a still further object of the invention being to provide a single adjusting element, whereby the maximum degree of the frictional contact between the rings may be regulated.

Having these ends in view, the invention consists in the construction described in the following specification and clearly pointed out in the claims forming part thereof, the construction being fully illustrated in the accompanying drawings, in which—

Figure 2:
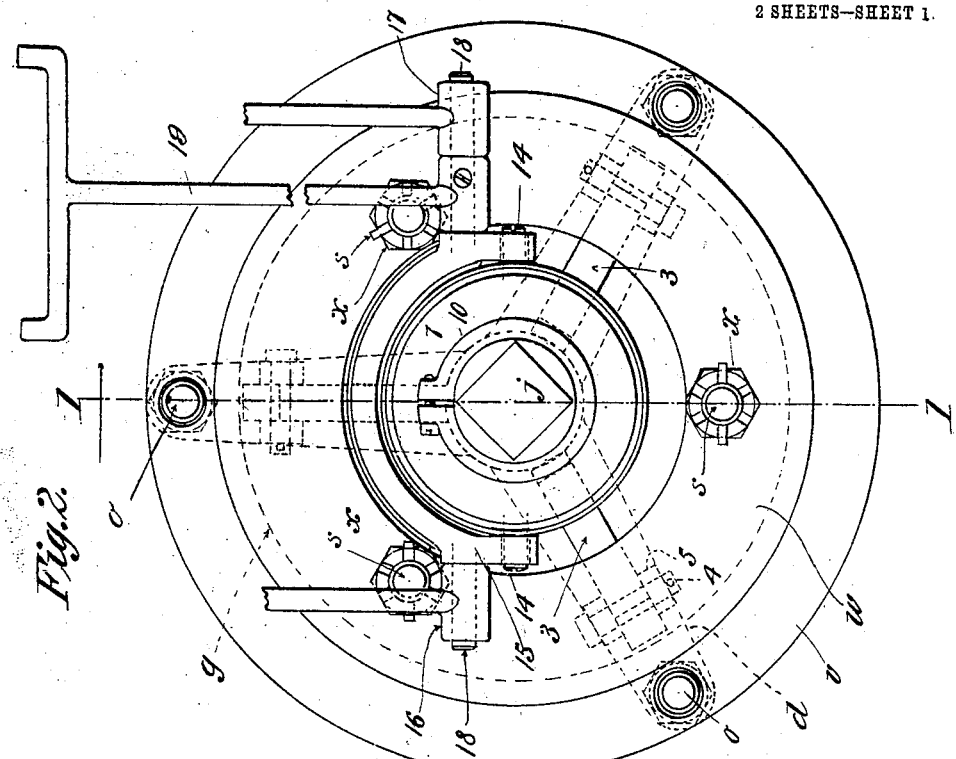
Figure 1:
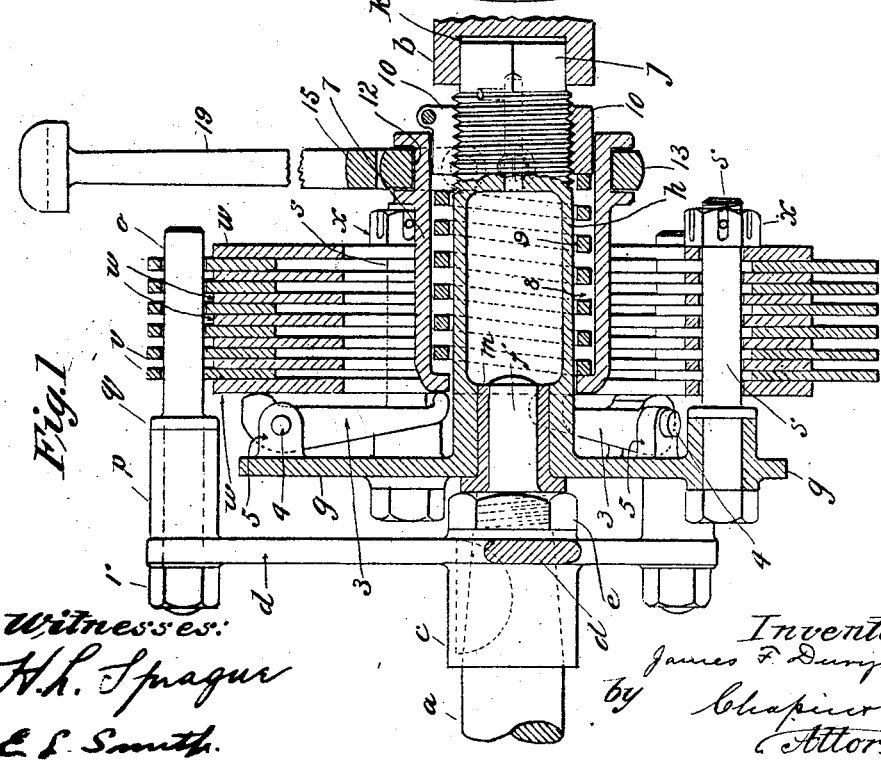

Figure 1 is a sectional elevation of a clutch construction in which this invention is embodied, certain parts being shown in full lines, the plane of the section being on line 1 1, Fig. 2. Fig. 2 is an elevation of the same as viewed from the right-hand side of Fig. 1. Fig. 3 is a side elevation of a casing for the clutch mechanism, the operating-lever extending through the wall thereof. Fig. 4 is a sectional elevation of the same on line 4 4, Fig. 3, this figure, as well as Fig. 4, being on a somewhat reduced scale.

The clutch which forms the subject-matter of this application is designed especially for use on self-propelled vehicles, in which it is desirable and often necessary to utilize all of the machinery space to the greatest possible advantage, and this clutch has been designed with special reference to its use on these vehicles. In this connection it should be stated that there are two types of this kind of clutch, one of which is intended to be run dry and the other of which is designed to be run in oil, the clutch forming the subject-matter of this application being of that kind designed to run in oil.

In the drawings, $a$ indicates the end of the crank-shaft of a motor or some like driving-shaft, and $b$ the end of a driven shaft. On the end of the shaft $a$ is a frame consisting of the hub $c$, keyed on the shaft and provided with a number of radially-disposed arms $d$, extending therefrom, said hub and arms being preferably integral.

In the drawings the construction is shown as embodying these arms $d$, set at equal distances apart on the hub, this number of arms having been found to provide the necessary rigidity, but their number may be increased if desired, or a disk may be employed instead of the arms, though this adds unnecessary weight.

Preferably in fixing the hub $c$ on the end of the crank-shaft $a$ the two parts are tapered and keyed, and after the hub has been so fitted to the shaft a nut $e$ is screwed onto the end of the latter against the hub to insure as far as possible an immovable connection between the hub and the shaft. Beyond the nut $e$ the shaft $a$ is extended, as shown at $f$, to provide a bearing for the inner end of a second clutch-frame, which consists of a disk $g$ on the end of a long hub $h$, the outer end of which is squared off, as at $j$, to enter the squared socket $k$ in the end of the driven shaft $b$. Over the end $f$ of the shaft $a$ is fitted a bushing $m$, having a flanged head thereon, which is interposed between the inner end of the hub $h$ and the nut $e$ and bears on a shoulder on the end of the shaft, resulting from the turning down of the extension $f$ of said shaft to a smaller diameter.

The frame, consisting of the hub $c$ and the arms $d$, together with the parts of the clutch supported thereon, may be referred to for the sake of conciseness as the "driving" clutch-head, and the disk $g$ and hub $h$, together with the clutch elements mounted thereon, may be referred to as the "driven" clutch-head.

At the extremities of the arms $d$ the pins $o$ are mounted, one in the end of each arm, to render them rigid, passing through bosses $p$, cast integral with the arms, and are secured therein in any convenient manner; but preferably they are provided with flanges $q$ to bear against the end of the boss, and a nut $r$ is threaded onto the end of the pin, which extends through the arm. It is understood that these pins are parallel with the axis of the crank-shaft and equidistant therefrom.

In the disk $g$ three other pins $s$ are mounted, which are equally spaced between the pins $o$ and are mounted in said disk in substantially the same manner as the pins $o$ are secured in the arms $d$. These pins are likewise parallel with the axis of the shaft $a$. Over the pins $o$ and the pins $s$ are fitted alternately the friction-rings $v$ and $w$, the rings $v$ being on the pins $o$ and the alternating relation of the rings being shown in Fig. 1. These rings $v$ and $w$ are of metal and have holes punched therein to fit their respective pins loosely, to the end that they may move more or less thereon endwise.

This clutch being of that type intended to run in oil, the metal disks run directly in contact one with the other instead of being faced with leather or some such material, which is used when the clutch is designed to run with dry contact-surfaces. Preferably these rings are made of gun-metal and are turned off smoothly on each side.

After the rings $w$ have been fitted on the pins $s$ in proper alternating relation with the rings $v$ the nuts $x$ are screwed onto the ends of the pins $s$ and locked thereon by means of any of the well-known devices used for that purpose. These nuts constitute the abutments which receive the thrust of the devices which compress the overlapping portions of the rings $v$ and $w$. Where clutches of this character are run in oil and the frictional surfaces consist of bare metal plates, it is obvious that greater compression will be required to provide a given frictional driving contact than would be required with a like clutch whose contact-surfaces are not only not lubricated, but are constructed of substances which normally offer more frictional resistance than do metal surfaces. Therefore the means provided herein for the compression of the overlapping borders of the rings $v$ and $w$ consist in a plurality of radially-arranged levers 3, pivotally supported on pins 4, passing through these levers and through lugs 5, cast on the disk $g$ at right angles to the face thereof and near the periphery of said disk. The short arm of these levers 3 lies in contact with the innermost of the rings $w$, and the long arm extends radially inward to a point close to the surface of the hub $h$, the end of said arm being located directly at the inner end of a hub 7, which is mounted on the hub $h$ to slide thereon, the interior of this hub being turned out to provide an annular recess 8 for the reception of a stiff spiral spring 9, which bears against the inner end of the recess 8 and against the inner end of a pinch-nut 10, which is screwed onto the threaded portion of the hub $h$ at the outer end thereof, the outer surface of this nut constituting a bearing for the outer end of the hub 7. By screwing up this pinch-nut the spring 9 may be compressed more or less, and the nut 10, (constituting a fixed abutment for one end of the spring,) the expansion of the latter obviously will move the hub 7 toward the disk $g$ and swing the levers 3 on their pivots, thus bringing the short ends of said levers to bear against the inner one of the rings $w$, and as the outer ring $w$ abuts against the nuts $x$ the rings $v$ will be pinched between the rings $w$, and as the rings $v$ are carried by the driving clutch-head, movement will be imparted to the driven clutch-head on which the rings $w$ are carried, proportionately to the frictional contact between the rings $v$ and the rings $w$, as determined by the expansion of the spring 9.

On the outer end of the hub 7 is a broad flange in which is turned an annular groove 12 to receive a loose ring 13, which is provided with trunnions 14, to which the ends of a semicircular fork 15 are connected, which fork is arranged to swing in bearings 16 and 17, which are represented in the drawings merely in a conventional manner, the fork being provided with the trunnions 18, located above the ends of the fork and extending into the fixed bearings 16 and 17. On one of these trunnions (see Fig. 2) a lever 19 is secured, whereby the fork may be oscillated in its bearings and sliding movement thereby be communicated to the hub 7 through the ring 13, mounted, as described, in the annular groove in the end of said hub, and it is the function of said lever 19 to compress the spring 9 to relieve the rings $v$ and $w$ from frictional contact with one another, and thus break the connection between the driving and the driven shafts. If all pressure on the lever 19 is removed, the expansion of the spring 9 will move the hub 7 toward the disk $g$, and thus compress the rings $v$ of the driving clutch-head between the rings $w$ of the driven clutch-head, the nuts $x$ in the ends of the arms $s$, as stated, taking all of the thrust of this compression.

The above-described construction sets forth clearly the means of connection between the driving and the driven shafts, and it is apparent that the separation of the driven shaft $b$ from the squared end $j$ of the hub $h$ is all that is necessary to effect the easy dismounting of the clutch.

The spring 9 is adjusted by the manipulation of the pinch-nut 10, so that the maximum effort of the clutch may be adjusted to be just equal to the load it has to transmit from the shaft $a$ to the shaft $b$, and to effect this adjustment it is very desirable, especially when the clutch forms part of the mechanism of a self-propelled vehicle, that this adjustment should be easily made and that one adjustment alone should be required, and to this end the pinch-nut is so located that it may be readily manipulated to increase or decrease the tension of the spring 9. With the clutch thus adjusted to the load it is immaterial how quickly the clutch be thrown onto its full power, even with the shaft $a$ running at its maximum speed, for as the clutch is only equal to the torque of said shaft when the latter has picked up its load it will of course slip when the load exceeds this point, picking up its load gradually as the momentum of the shaft $a$ is overcome, and the driven shaft will thus start without a jump, even though the clutch is thrown in suddenly.

By practically nesting the driving clutch-head and the driven clutch-head great economy of space results not only because of the compactness of the mechanism itself on account of this nested disposition of the parts, but because of the fact that it requires only the separation of the squared end $j$ of the hub $h$ from the socket in the end of the driven shaft $b$ to separate the driven and the driving clutch-heads.

Figs. 3 and 4 show a casing in side elevation and sectional elevation, respectively, within which the clutch mechanism is inclosed, said casing constituting an oil-reservoir whereby all of the frictional parts of the machine may be thoroughly lubricated, the clutch mechanism running in contact with the oil or partially immersed therein. This casing is preferably made in two parts 20 and 21, bolted together in the plane of the axis of the shafts $a$ and $b$, and preferably in the part 20 oppositely-located bosses 22 are cast, which constitute bearings for the trunnions of the fork 15.

To permit the easy assembling of the parts, the trunnions 18 of this fork are secured in collars 23 and 24, into which collars the shafts 25 on the one side and 26 on the other extend through the aforesaid bearings, the shaft 26 and one trunnion being secured in the collar 23 by set-screws, whereby the lever 19 may effect the oscillation of the fork 15 to operate the sliding hub 7, as described, the other trunnion turning freely in the collar 24, and the latter turning freely on the end of the shaft 25, which may be secured in its bearing in any suitable manner, as being screwed therein. This specifically-described construction, however, forms no part of the invention and any other means for mounting the fork in the casing to provide for the easy assembling of the parts may be substituted therefor, if desired.

The clutch-casing is provided with suitable hubs 28 and 29, through which the shafts $a$ and $b$ extend.

Any suitable device may be provided to lock the lever 19 in a position which will hold the driving and driven clutch-heads out of operative contact one with the other. No such means, however, have been shown in the drawings nor need any be shown, for a notched plate or some similar device may be used for this purpose.

Having thus described my invention, what I claim, and desire to secure by Letters Patent of the United States, is—

1. In a friction-clutch mechanism, a frame mounted on the driving-shaft, pins on the frame parallel with the axis of the shaft; a second frame having a driving connection with the driven shaft, pins on the frame parallel with the first-named pins, said second frame being nested within the first and the pins on both extending in the same direction; a plurality of friction-rings supported loosely on the pins of each frame and arranged in alternative overlapping relation one with the other, nuts on the ends of the pins of the second frame constituting abutments for the rings, and radially-disposed levers pivotally supported on said second frame, the outer ends of which are arranged to bear against said rings to move the latter in the direction of said nuts, a member movable against the inner end of said levers to actuate the latter simultaneously, a spring to move said member, an adjusting device for the spring, and mechanism connected with said movable member to effect the compression of the spring.

2. The combination with a driving and a driven shaft, of a friction-clutch mechanism consisting of a frame secured on the driving-shaft, and a second frame comprising a long hub and radial arms thereon and having a bearing on the driving-shaft and a driving connection with the driven shaft; pins on said frames parallel with the axis of the shaft and extending in the same direction, said second frame being nested within the area circumscribed by the pins of the other; friction-rings supported loosely on the pins of each frame, those on the one alternating with and overlapping those on the other; radially-disposed levers pivotally supported on the arms of the second frame, a sliding hub mounted on the hub of the second frame, a spring to actuate the sliding hub to move it against the inner ends of said levers, a lever connected with said sliding hub to move it in the opposite direction, an adjusting device on the hub of the second frame to limit the movement of said sliding hub in one direction, and a suitable abutment against which said rings may be forced by said radial levers.

3. A friction-clutch mechanism comprising a driving-shaft, a frame consisting of a hub and radially-disposed arms extending therefrom, said hub being secured to the driving-shaft the end of the latter extending beyond said frame; a second frame consisting of a hub and radially-disposed arms, said hub having a bearing on the extended end of the driving-shaft and having a driving connection with the driven shaft; pins on the arms of each frame extending in the same direction and parallel with the axis of the driving-shaft, friction-rings supported loosely on the pins of each frame, those on the one alternating with and overlapping those on the other; radially-disposed levers supported on the arms of the second frame, a sliding hub on the hub of the second frame, a spring to actuate the sliding hub to move it against the inner end of said levers, a lever connected with said sliding hub to move it in the opposite direction, an adjusting device on the hub of the second frame to limit the movement of the sliding hub in one direction, and a suitable abutment carried on the ends of the pins of one of said frames against which said rings may be forced by said radial levers.

4. In a friction-clutch mechanism, a driving clutch-head consisting of a hub and radially-disposed arms thereon, pins in the ends of said arms parallel with the axis of said hub, and friction-rings supported loosely on said pins, said head being connected to the driving-shaft; a driven clutch-head consisting of a long hub bearing at one end on the driving-shaft rotatably, and having a driving connection at its opposite end with the driven shaft, radial arms on the hub, pins in the ends of the arms parallel with the axis of the hub, the arms of said driven head being shorter than the arms of the driving-head, friction-rings supported on said pins and arranged in alternative overlapping relation with those on the driving-head, radially-disposed levers pivotally supported on the driven head, the inner ends of said levers lying in proximity to said hub; a second hub slidably mounted on the hub of the driven head to bear against the inner ends of said levers, a spring located within said sliding hub to move the latter toward said levers, and an adjusting-nut for said spring screwed onto the hub of the driven head, said nut constituting a bearing for one end of said sliding hub and constituting an abutment for said spring; a lever to move said sliding hub to effect the compression of the spring; and a suitable abutment for said friction-rings supported on the ends of the pins of one of said frames.

5. In a friction-clutch, a driving-shaft and a driven shaft, a long hub having a bearing on the driving-shaft, and a driving connection with the driven shaft, radial arms on the hub, and pins in the ends of the arms parallel with the axis of the hub, together with friction-rings carried on the pins loosely; radially-disposed levers to bear against the friction-rings to move them toward the ends of the pins, a sliding member on said hub to actuate said levers, and a spring encircling the hub to actuate said sliding member; a second hub connected with the driving-shaft, radial arms on said hub, and pins in the ends of the arms located outside of said first-named pins and extending in the same direction, friction-rings carried loosely on these pins and arranged in alternative overlapping relation to the other friction-rings; an adjusting-nut on said hub constituting an abutment for said spring; a tight casing to inclose the mechanism, together with means extending through the wall of the casing to move said sliding member to compress the spring.

JAMES FRANK DURYEA.

Witnesses:
K. I. CLEMONS,
WM. H. CHAPIN.